E. R. OLSEN.
INTERNAL COMBUSTION ENGINE.
APPLICATION FILED DEC. 15, 1919.
Reissued July 19, 1921.
15,160.
5 SHEETS—SHEET 1.
Fig. I.
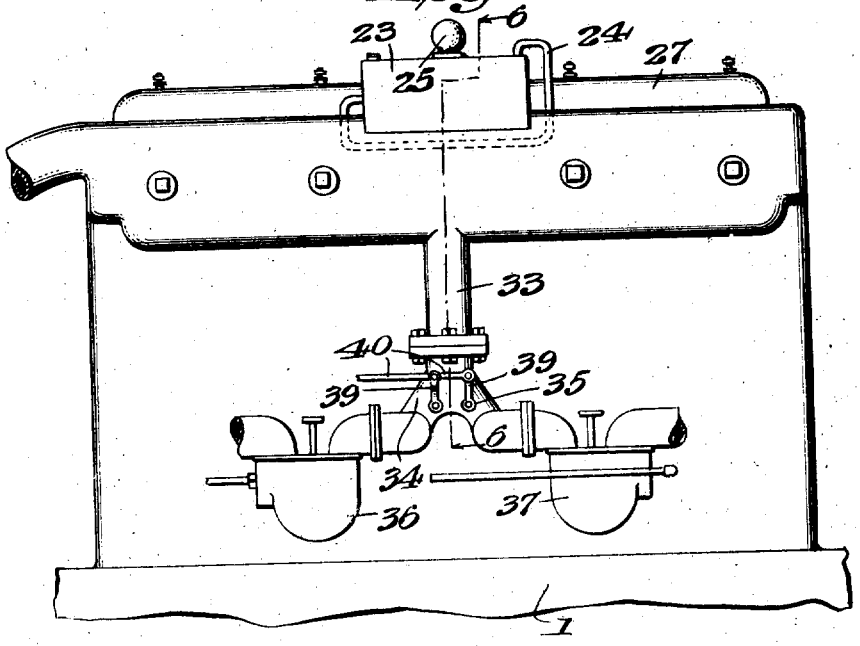
Fig. II.
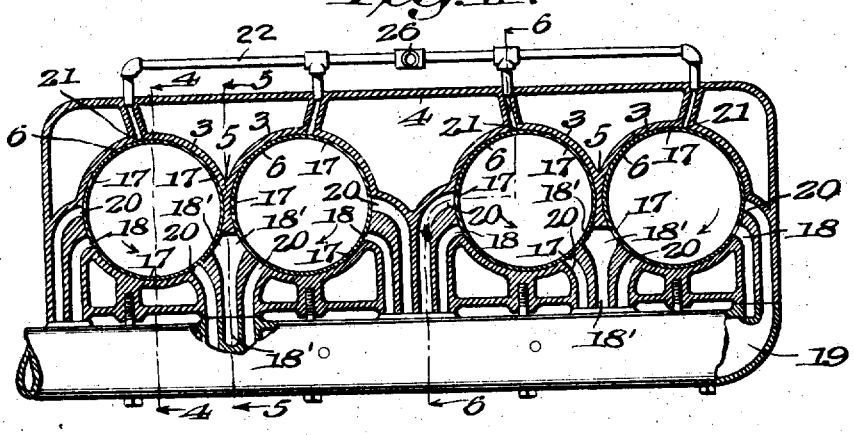
Fig. VII.
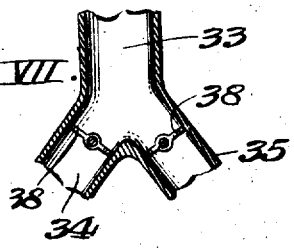
Inventor
Ernest R. Olsen.
By
Attorneys E. R. OLSEN.
INTERNAL COMBUSTION ENGINE.
APPLICATION FILED DEC. 15, 1919.
Reissued July 19, 1921. 15,160.
5 SHEETS—SHEET 2.
Fig. IV.
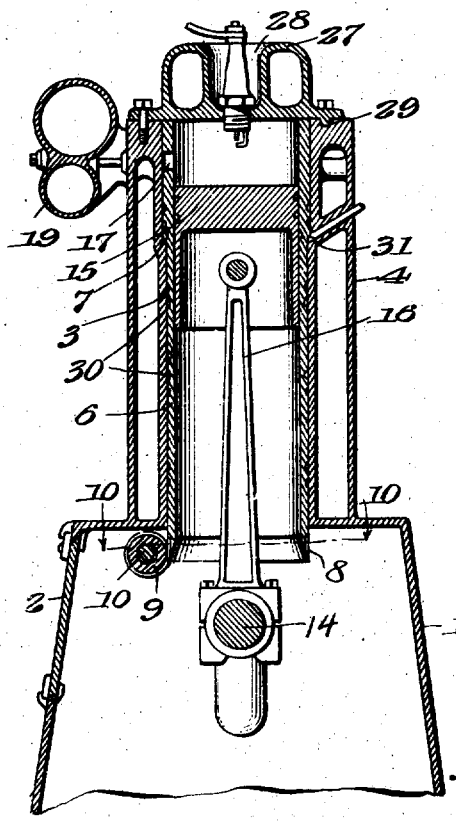
Fig. V.
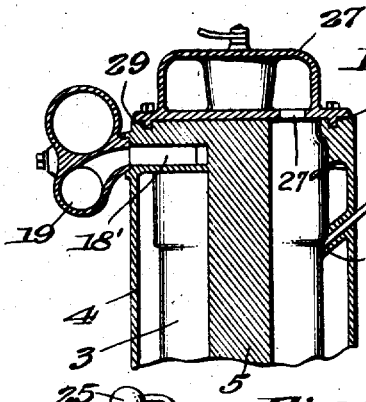
Fig. VI.
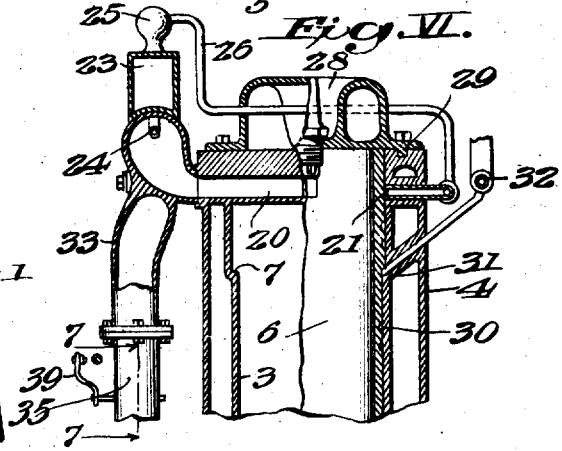
Fig. III.
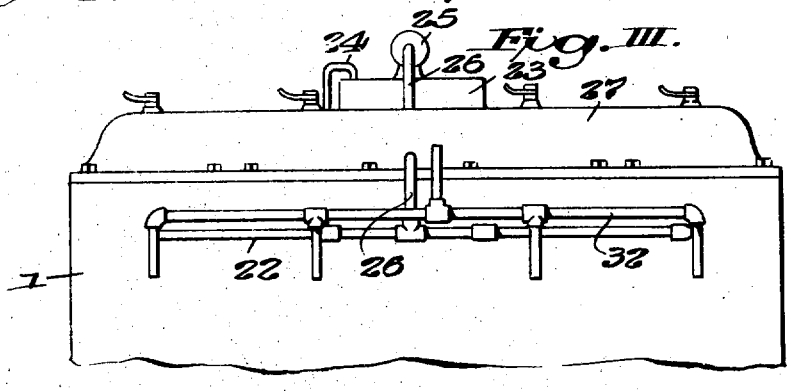
Inventor
Ernest R. Olsen,
By Rushford & Rushford
Attorneys E. R. OLSEN.
INTERNAL COMBUSTION ENGINE.
APPLICATION FILED DEC. 15, 1919.
Reissued July 19. 1921.
15,160.
5 SHEETS—SHEET 3.
Fig. IX.
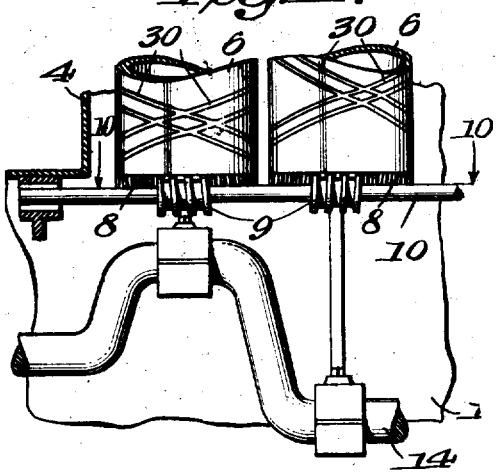
Fig. VIII.
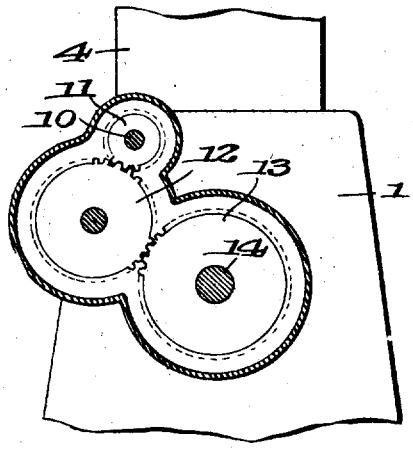
Fig. X.
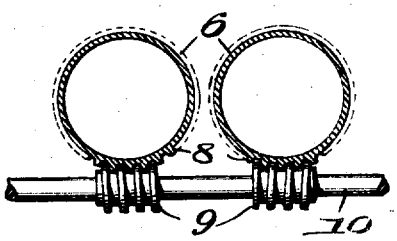
Inventor
Ernest R. Olsen,
By Paul Maycher
Attorneys E. R. OLSEN.
INTERNAL COMBUSTION ENGINE.
APPLICATION FILED DEC. 15, 1919.
Reissued July 19, 1921. 15,160.
5 SHEETS—SHEET 4.
Fig. XI.
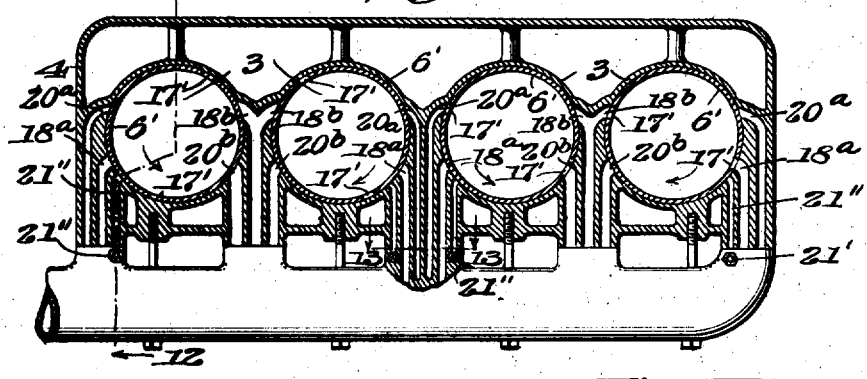
Fig. XII.
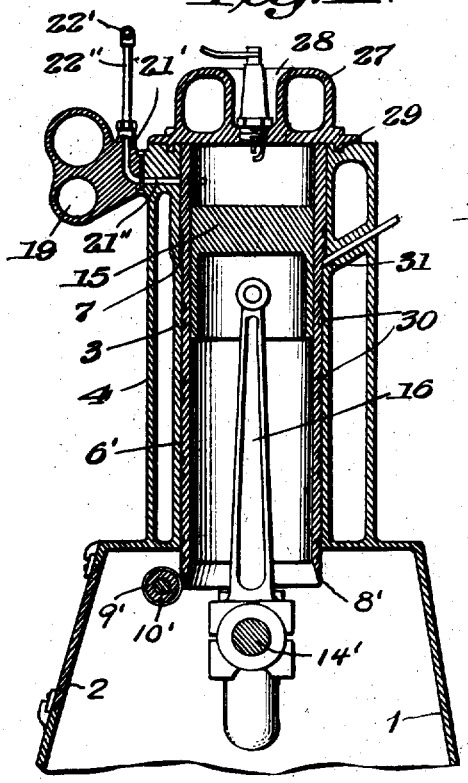
Fig. XIV.
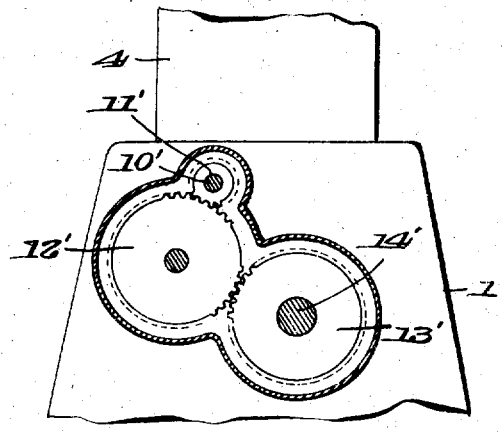
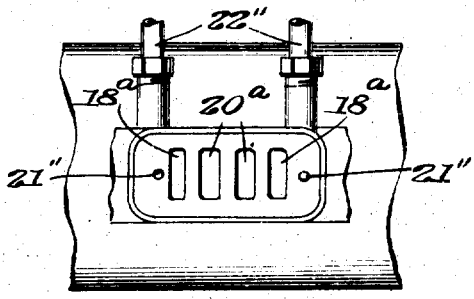
Fig. XIII.
Inventor
Ernest R. Olsen,
By Rathbun & Rathbun
Attorney E. R. OLSEN.
INTERNAL COMBUSTION ENGINE
APPLICATION FILED DEC. 15, 1919.
Reissued July 19, 1921. 15,160.
5 SHEETS—SHEET 5.
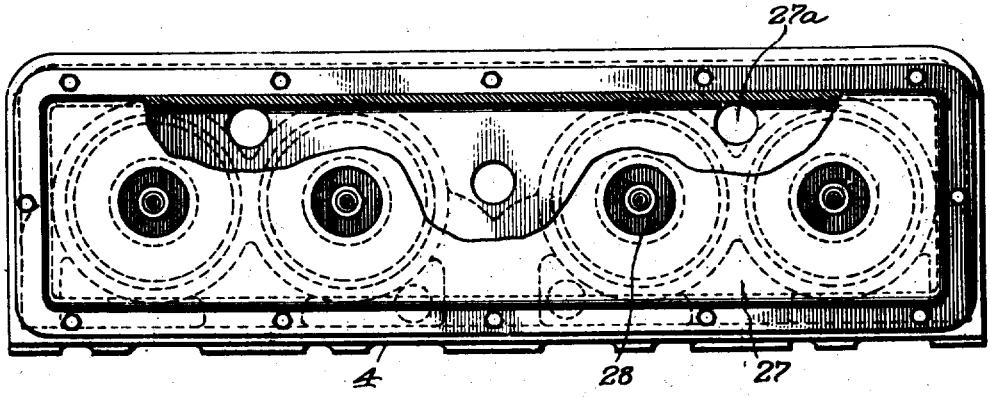
Fig. XVI.
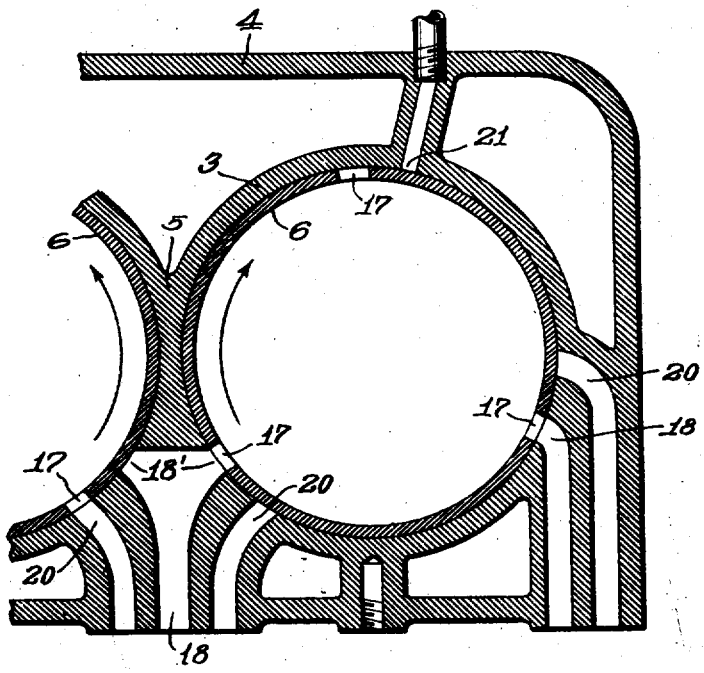
Fig. XV
Inventor
Ernest R. Olsen,
By Arthur P. Dubois
Attorneys

UNITED STATES PATENT OFFICE.

ERNEST R. OLSEN, OF DETROIT, MICHIGAN, ASSIGNOR TO GEORGE WILLIAM OLSEN, OF MUSKEGON, MICHIGAN.

INTERNAL-COMBUSTION ENGINE.

15,160. Specification of Reissued Letters Patent. Reissued July 19, 1921.

Original No. 1,266,849, dated May 21, 1918, Serial No. 187,196, filed August 20, 1917. Application for reissue filed December 15, 1919. Serial No. 345,033.

*To all whom it may concern:*

Be it known that I, ERNEST R. OLSEN, a citizen of the United States, residing at Detroit, county of Wayne, and State of Michigan, have invented certain new and useful Improvements in Internal-Combustion Engines, of which the following is a specification.

This invention relates to internal combustion engines.

The objects of this invention are:

First, to provide in an internal combustion engine an improved cylinder structure.

Second, to provide an internal combustion engine having an internal rotary cylinder sleeve member constituting a valve and which may be removed and inserted from the outer end of the cylinder without removing the piston.

Third, to provide an engine of the rotary valve sleeve type which is simple in structure, economical to manufacture and efficient in operation.

Fourth, to provide an internal combustion engine of the type described in which the crank shaft makes a plurality of revolutions to a single revolution of the sleeve valve.

Fifth, to provide an internal combustion engine of the type described, with means for admitting steam to the cylinders thereof during each intake stroke of the pistons.

Sixth, to provide novel means utilizing the heat of the exhaust for supplying steam to said cylinders.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side elevation of a structure embodying the features of my invention.

Fig. II is a detail horizontal section thereof showing the arrangement of the ports and passages.

Fig. III is an elevation of the side opposite that shown in Fig. I.

Fig. IV is a vertical transverse section on a line corresponding to line 4—4 of Fig. II.

Fig. V is a detail vertical transverse section on a line corresponding to line 5—5, of Fig. II.

Fig. VI is a detail vertical transverse section on a line corresponding to the broken lines 6—6 of Figs. I and II, portions of the cylinder head being broken away.

Fig. VII is an enlarged detail section on a line corresponding to line 7—7 of Fig. VI.

Fig. VIII is a detail end elevation of my improved engine portions being broken away, and the gear case shown in section.

Fig. IX is an enlarged detail section showing the driving connections between the worm shaft and sleeve valves.

Fig. X is an enlarged detail section taken on a line corresponding to line 10—10 of Figs. IV and IX.

Fig. XI is a detail horizontal section similar to Fig. II of a modified embodiment of my invention.

Fig. XII is a vertical transverse section taken on a line corresponding to line 12—12 of Fig. XI.

Fig. XIII is a side elevation of a portion of the combined exhaust, steam, and intake manifold, taken in the direction of the arrows 13—13 of Fig. XI.

Fig. XIV is a partial end elevation of the base of my improved engine showing the connections between the crank shaft and the worm shaft for actuating the sleeve valves, a portion of the gearing housing being broken away.

Fig. XV is a detail sectional view, the view being an enlarged scale showing of the cylinders shown at the right in Fig. II, the view disclosing more clearly the port arrangement of valve and cylinder.

Fig. XVI is a plan view, with parts broken away, of the cylinder head formation, showing one way in which the interior of the head communicates with the water jacket.

In the drawing similar reference characters refer to similar parts throughout the several views, and the sectional views are taken looking in the direction of the little arrows at the ends of the section lines.

Referring to the drawing, my improved engine comprises the base 1, which may have any suitable contour and is provided with a manhole having the closure 2 therefor.

The cylinders 3 are, in the embodiment illustrated, formed integral with the upper portion of the base and are surrounded by a water jacket 4, which is also formed integral therewith. The cylinders 3 are formed in pairs connected by the webs 5.

The internal cylinder sleeves or valve members 6 are rotatably mounted within the cylinders 3. The cylinders and valve members are provided with coacting shoulders, as indicated at 7 in Fig. IV, whereby the valve members are rotatably supported in the cylinders. The lower ends of the valve members project from the lower ends of the cylinders and are provided with gear teeth 8, which are engaged by the threads of the worms 9 on the worm shaft 10. The worms for each pair of cylinders are pitched in opposite directions, as indicated in Figs. IX and X, so as to drive the sleeve valves of each pair of cylinders in opposite directions.

The worm shaft 10 is provided with a pinion 11 which meshes with an idler 12 driven by a gear 13 on the crank shaft 14, driven in synchronism with the movements of the crank shaft.

The pistons 15 reciprocate in the sleeve members 6 and are connected by means of pitmen 16 with the crank shaft. Each of the members 6 is provided with three inlet ports 17, which lie in the same plane and are uniformly spaced. Each cylinder is provided with a pair of inlet ports 18 and 18′ respectively. The inlet ports 18 and 18′ are connected by means of passages, formed integral with the cylinders and water jacket, with the intake manifold 19, the intake ports 18′ being connected with the manifold by means of a common passage as shown in Fig. II. The inlet ports 18 and 18′ are spaced apart an angular distance equal to the spacing of the ports 17 in the sleeve valves, whereby two of the ports 17 may register with the ports 18 and 18′ simultaneously.

Each cylinder 3 is also provided with a pair of exhaust ports 20, which are spaced apart an angular distance equal to the angular spacing of the ports 17 of the valve member.

The ratio of the gearing between the crank shaft 14 and valve members 6 is such that the former makes six revolutions to a single revolution of the latter. This means that the engine will perform three complete cycles during each revolution of the valve member. The intake ports 18 and 18′ are, therefore, spaced from the adjacent port 20 substantially thirty degrees.

I also provide means for admitting steam to the cylinder during the latter part of each intake stroke. This means comprises the ports 21, which are so located that they register with one of the sleeve valve ports 17 during the latter part of each intake stroke. These ports are connected by means of passages, cast integral with the water jacket, with the steam manifold 22.

For supplying steam to the manifold 22 I provide a steam boiler 23, which is separate from, but supported upon, the exhaust manifold, the bottom wall of the boiler being conformed to the contour of the exhaust manifold in order to insure efficient heat transmission.

In order to provide for more efficient heating of the water in the boiler 23 I provide a circulation tube 24, one end of which is connected with the lower side of the boiler and the other end of which is connected to the upper side of the boiler, an intermediate portion of the circulation tube passing through the exhaust manifold, as shown in dotted lines in Fig. I.

To provide for a greater evaporative power, the surface of that portion of the circulation tube which passes through the exhaust manifold may be increased in any desirable manner. A steam dome 25 communicates with the boiler 23 and receives the steam therefrom. A pipe 26 leads from the steam dome 25, to the steam manifold 22, a portion of the pipe passing through the cylinder head 27, as shown in Figs. III and VI.

The cylinder heads are formed of a single hollow integral body member having the depressions 28 therein for receiving the spark plugs. Depending annular flanges 29 at the lower side of the cylinder head coact with corresponding grooves in the top of the cylinder walls to form a tight joint between the cylinder and the cylinder head. The bottom of the cylinder head is also provided with apertures 27ᵃ opening into the water jacket.

The outer peripheries of the sleeve valves are provided with crossed spiral grooves 30 for receiving lubricating oil under pressure. The oil is supplied through the passageways 31 and the lubrication manifold 32. The oil is supplied under pressure and therefore works along the spiral grooves 30.

The lower end of the intake conduit 33 is formed with branches 34 and 35 which lead to the carbureters 36 and 37, respectively. One carbureter is designed for the use of the heavier distillates, such as kerosene, and the other is intended to be used with the lighter or more volatile distillates. Butterfly valves 38 are mounted in each of the branches 34 and 35 and are operated by means of the cranks 39 and the rods 40 connected thereto.

It is believed that the operation of my improved engine will be apparent from the above description.

Referring to Fig. II, the valve members, starting with the left hand cylinder and continuing toward the right, are shown in firing, compression, exhaust and intake positions, respectively. Referring to the right hand cylinder, it will be seen that before the completion of the intake stroke of the piston in this cylinder the valve port 17 will register with the steam port 21, thereby admittitng steam to the cylinder during the latter part of the intake stroke.

By providing a plurality of intake and exhaust ports in the cylinder and valve members, the explosive charges are readily drawn into the cylinder and the exhaust gases encounter little resistance to their expulsion therefrom, and, by providing means for applying a suitable quantity of steam to the cylinder during the intake stroke the vaporization and combustion of the fuel is rendered more efficient and deposition of carbon upon the cylinder walls largely prevented.

By providing the two carbureters and the butterfly valve 38 the more volatile fuels may be used for starting the engine, and then by properly manipulating the butterfly valve 38 the engine may be run upon the heavier fuels.

By providing shoulders upon the sleeve valves which coact with the shoulders 4 of the cylinders, and by cutting the gear teeth 8 in the lower edge of the sleeve valves, I provide means whereby they may be quickly and easily removed through the top of the cylinder without disturbing the pistons and their connections with the crank shaft.

In the modified embodiment of my invention disclosed in Figs. XI to XIV inclusive, I have illustrated a construction in which the crank shaft is designed to make four revolutions to each revolution of the sleeve valve. In order to secure this result I have provided the valve members 6′ with oppositely disposed ports 17′ which simultaneously register with the inlet ports 18ᵃ and 18ᵇ, or the exhaust ports 20ᵃ and 20ᵇ, twice during each revolution of the valve member. The arrangement of the inlet ports and the exhaust ports in this embodiment of my invention is the same as that in the embodiment previously described, except that the inlet ports are spaced slightly from the exhaust ports. In this modification of my invention the inlet and exhaust manifolds are formed integrally, as in the embodiment first described, and this combined manifold is provided with additional passages 21′ which are connected with the steam manifold 22′ by means of branched conduits 22″, the opposite ends of the steam passages 21′ discharging into steam conduits 21″ that are formed integral with the cylinder casting, and discharge adjacent the intake ports 18ᵃ, these steam ports being spaced relative to the intake ports 18ᵃ in such a manner that they discharge into the cylinders during the latter portions of the intake strokes of the pistons. The steam manifold 22′ may receive its steam supply from a steam boiler similar to that described above or from any other suitable source.

The gears 11′, 12′, 13′ and the worm wheel 8′ and worm 9′ should be so designed that the crank shaft 14′ will make four revolutions to each revolution of the sleeve valve 6′.

While I have illustrated and described two embodiments of my invention, I desire it to be understood that my invention is capable of other adaptations and modifications falling within the scope of the appended claims.

Having thus described my invention, what I claim as new is:

1. In an internal combustion engine, the combination of a plurality of internally shouldered cylinders each provided with pairs of alternating intake ports and exhaust ports and a steam inlet port lying in the same plane, rotatable internal valve members shouldered to coact with the shoulders of said cylinders and disposed to project from the inner ends thereof and provided with worm teeth on their projecting ends, said valve members being provided with three uniformly spaced valve ports lying in the plane of said cylinder ports and adapted to be brought into register therewith as the valve members rotate, the pairs of cylinder intake and exhaust ports being spaced uniformly with said valve ports, the steam ports of the cylinders being positioned so that one of the valve member ports register therewith during each intake stroke, steam delivery connections to said steam inlet ports, pistons reciprocating in said valve members, a crank shaft, a worm shaft provided with worms coacting with the worm gears of said valve members, and driving connections between said worm and crank shafts.

2. In an internal combustion engine, the combination of a plurality of cylinders each provided with pairs of alternating intake ports and exhaust ports and a steam inlet port lying in the same plane, rotatable internal valve members disposed to project from the inner ends thereof and provided with worm teeth on their projecting ends, said valve members being provided with three uniformly spaced valve ports lying in the plane of said cylinder ports and adapted to be brought into register therewith as the valve members rotate, the pairs of cylinder intake and exhaust ports being spaced uniformly with said valve ports, the steam ports of the cylinders being positioned so that one of the valve member ports registers therewith during each intake stroke, steam delivery connections to said steam inlet ports, pistons reciprocating in said valve members, a crank shaft, a worm shaft provided with worms coacting with the worm gears of said valve members, and driving connections between said worm and crank shafts.

3. In an internal combustion engine, the combination of a plurality of internally shouldered cylinders each provided with pairs of alternating intake ports and exhaust ports and a steam inlet port lying in the same plane, rotatable internal valve members shouldered to coact with the shoulders of said cylinders and said valve members being provided with three uniformly spaced valve ports lying in the plane of said cylinder ports and adapted to be brought into register therewith as the valve members rotate, the pairs of cylinder intake and exhaust ports being spaced uniformly with said valve ports, the steam ports of the cylinders being positioned so that one of the valve member ports registers therewith during each intake stroke, steam delivery connections to said steam inlet ports and pistons reciprocating in said valve members.

4. In an internal combustion engine, the combination of a plurality of cylinders each provided with pairs of alternating intake ports and exhaust ports and a steam inlet port lying in the same plane, rotatable internal valve members, said valve members being provided with three uniformly spaced valve ports lying in the plane of said cylinder ports and adapted to be brought into register therewith as the valve members rotate, the pairs of cylinder intake and exhaust ports being spaced uniformly with said valve ports, the steam ports of the cylinders being positioned so that one of the valve member ports registers therewith during each intake stroke, steam delivery connections to said steam inlet ports, and pistons reciprocating in said valve members.

5. In an internal combustion engine, the combination of a plurality of cylinders each provided with pairs of alternating intake ports and exhaust ports and a steam inlet port lying in the same plane, rotatable internal valve members, said valve members being provided with three uniformly spaced valve ports lying in the plane of said cylinder ports and adapted to be brought into register therewith as the valve members rotate, the pairs of cylinder intake and exhaust ports being spaced uniformly with said valve ports, the steam ports of the cylinders being positioned so that one of the valve member ports registers therewith during each intake stroke, exhaust and intake manifolds formed integrally and having a wall in common whereby the intake manifold is heated, a steam generating boiler disposed in coacting relation with said exhaust manifold to be heated thereby, steam delivery connections from said boiler to said steam inlet ports, and pistons reciprocating in said valve members.

6. In an internal combustion engine, the combination of an internally shouldered cylinder provided with pairs of alternating intake ports and exhaust ports and a steam inlet port lying in the same plane, a rotatable internal valve member shouldered to coact with the shoulder of said cylinder and disposed to project from the inner end thereof, said valve member being provided with three uniformly spaced valve ports lying in the plane of said cylinder ports and adapted to be brought into register therewith as the valve member rotates, the pairs of cylinder intake and exhaust ports being spaced uniformly with said valve ports, the steam port being positioned so that one of the valve member ports registers therewith during each intake stroke, a steam delivery connection to said steam inlet port, a piston reciprocating in said valve member, a crank shaft, and a driving connection between the inner end of said valve members and said crank shaft.

7. In an internal combustion engine, the combination of a cylinder provided with pairs of alternating intake ports and exhaust ports and a steam inlet port lying in the same plane, a rotatable internal valve member disposed to project from the inner end thereof, said valve member being provided with three uniformly spaced valve ports lying in the plane of said cylinder ports and adapted to be brought into register therewith as the valve member rotates, the pairs of cylinder intake and exhaust ports being spaced uniformly with said valve ports, the steam port being positioned so that one of the valve member ports registers therewith during each intake stroke, a steam delivery connection to said steam inlet port, a piston reciprocating in said valve member, a crank shaft, and a driving connection between the inner end of said valve member and said crank shaft.

8. In an internal combustion engine, the combination of a cylinder provided with pairs of alternating intake ports and exhaust ports and a steam inlet port lying in the same plane, a rotatable internal valve member, said valve member being provided with three uniformly spaced valve ports lying in the plane of said cylinder ports and adapted to be brought into register therewith as the valve member rotates, the pairs of cylinder intake and exhaust ports being spaced uniformly with said valve ports, the steam port being positioned so that one of the valve member ports registers therewith during each intake stroke, a steam delivery connection to said steam inlet port, and a piston reciprocating in said valve member.

9. In an internal combustion engine, the combination of a cylinder provided with pairs of alternating intake ports and exhaust ports and a steam inlet port lying in the same plane, a rotatable internal valve member, said valve member being provided with three uniformly spaced valve ports lying in the plane of said cylinder ports and adapted to be brought into register therewith as the valve member rotates, the pairs of cylinder intake and exhaust ports being spaced uniformly with said valve ports, the steam port being positioned so that one of the valve member ports registers therewith during each intake stroke, an exhaust and intake manifold having a wall in common whereby the intake manifold is heated, a steam generating boiler disposed in coacting relation with said exhaust manifold to be heated thereby, a steam delivery connection from said boiler to said steam inlet port and a piston reciprocating in said valve member.

10. In an internal combustion engine, the combination with a cylinder provided with a pair of intake ports and a pair of exhaust ports alternating with each other, a steam inlet port disposed in the same plane, a rotatable internal valve member provided with three ports spaced so as to successively register with said intake and exhaust ports, said steam inlet port being positioned so that one of said valve ports registers therewith during the intake stroke, means for supplying steam to said steam port, a piston, a crank shaft, and driving connections between said crank shaft and said valve member.

11. In an internal combustion engine having a crank-shaft, the combination with a cylinder provided with a pair of intake ports and a pair of exhaust ports alternating with each other, a steam inlet port disposed in the same plane, a rotatable internal valve member provided with three ports spaced so as to successively register with said intake and exhaust ports, said steam inlet port being positioned so that one of said valve ports registers therewith during the intake stroke, means for supplying steam to said steam port, a piston, and driving connections between said crank shaft and said valve member.

12. In a structure of the class described the combination with a cylinder, of a sleeve valve member rotatably mounted in said cylinder and provided with a plurality of ports for successively admitting explosive charges to said cylinder and conveying the exhaust gases therefrom, a piston reciprocating in said cylinder, said cylinder also being provided with ports coacting with the ports of said valve member, and a steam inlet port positioned so as to successively register with said valve ports during the intake stroke, and means for supplying steam to said inlet port.

13. In an internal combustion engine, the combination with a cylinder, of a sleeve valve member rotatably mounted therein and provided with a plurality of ports, said cylinder being provided with alternate intake and exhaust ports and a steam inlet port adapted to register with said valve ports, a piston reciprocating in said sleeve valve, the said steam inlet port being positioned so as to register with the ports in said valve sleeve during the intake strokes of said piston, and means for supplying steam to said steam port.

14. In an internal combustion engine, the combination with a cylinder provided with inlet and exhaust ports and passages, of an intake manifold and an exhaust manifold communicating with said intake and exhaust passages respectively, and having a heat transmitting wall in common, of a sleeve valve rotatably mounted in said cylinder, the said cylinder and valve being provided with coacting ports for successively admitting explosive charges, and steam to said cylinder and then discharging the exhaust gases, means for supplying steam to said steam port comprising a boiler heated by the exhaust gases passing through said exhaust manifold, and means for alternately supplying light or heavy fuels to said intake manifold.

15. In an internal combustion engine, the combination with a cylinder provided with inlet and exhaust ports and passages, of an intake manifold and an exhaust manifold communicating with said intake and exhaust passages respectively, and having a heat transmitting wall in common, of a sleeve valve rotatably mounted in said cylinder, the said cylinder and valve being provided with coacting ports for successively admitting explosive charges and steam to said cylinder, and then discharging the exhaust gases, means for supplying steam to said steam port, and means for supplying fuel to said intake manifold.

16. In a structure of the class described the combination with a plurality of integrally formed cylinders, each having an annular groove in the end wall thereof, of a common cylinder head for said cylinders comprising a hollow body member having a flat bottom which forms closures for the ends of said cylinders, the said bottom being provided with a plurality of annular flanges coöperating with said annular grooves to form tight joints and with a plurality of apertures communicating with said water jacket, the said head being provided with depressions having apertured bottom walls for receiving spark plugs.

17. In an internal combustion engine, a cylinder having a face to receive a manifold and provided with two pairs of passages connecting the cylinder with such face and with each passage independent of the other passages, the cylinder ends of such passages being positioned to produce two pairs of alternating inlet and exhaust ports, a rotatable internal valve member provided with a plurality of ports greater in number than the number of inlet or exhaust ports and lying in the plane of the latter ports, said member ports being spaced so that two of them coact simultaneously with said inlet or exhaust ports, a piston reciprocating in said member, a crank shaft, and driving connections between the shaft and valve member.

18. In an internal combustion engine, a cylinder having a face to receive a manifold and provided with two pairs of alternating inlet and exhaust ports and with two pairs of inlet and exhaust passages, each passage being independent of the others and each opening to the cylinder and to such face with each pair arranged side by side, a rotatable internal valve member provided with three ports lying in the plane of the cylinder ports and spaced so that two of them coact simultaneously with said inlet or said exhaust passages, a piston reciprocating in the valve member, a crank shaft, and driving connections between the shaft and valve member.

19. In an internal combustion engine, a cylinder having a face to receive a manifold and provided with two pairs of alternating inlet and exhaust ports and with two pairs of inlet and exhaust passages, each passage being independent of the others and each opening to the cylinder and to such face with each pair arranged side by side and having a heat transmitting wall in common, a rotatable internal valve member provided with three ports lying in the plane of the cylinder ports and spaced so that two of them coact simultaneously with said inlet or said exhaust passages, a piston reciprocating in the valve member, a crank shaft, and driving connections between the shaft and valve member.

20. In an internal combustion engine, a cylinder having two pairs of alternating inlet and exhaust ports lying in the same plane, and a sleeve valve rotatably mounted to operate within the cylinder and provided with three ports, said ports being relatively positioned and the movements of the valve timed to cause each valve port to coact with the respective pairs of cylinder ports during a succession of three cycles with a valve port active with the pairs of ports during two succeeding cycles and inactive relative to such ports during the third cycle.

21. In an internal combustion engine, a cylinder having two pairs of alternating inlet and exhaust ports lying in the same plane, and a sleeve valve rotatably mounted to operate within the cylinder and provided with a plurality of ports spaced at equal angular distances in the circumferential length of the valve and being greater in number than the totality of cylinder inlet ports, said cylinder and valve ports being relatively positioned and the valve movements timed to cause a valve port, in two succeeding cycles, to coact with each of said pairs of ports and to be inactive with either of such pairs of ports during a third cycle.

22. In an internal combustion engine, a cylinder having two pairs of alternating inlet and exhaust ports lying in the same plane, and a sleeve valve rotatably mounted to operate within the cylinder and provided with a plurality of ports spaced at equal angular distances in the circumferential length of the valve and being greater in number than the totality of cylinder inlet ports, said cylinder and valve ports being relatively positioned and the valve movements timed to cause a valve port, in two succeeding cycles, to coact with each of said pairs of ports and to be inactive with either of such pairs of ports during a third cycle, each of the valve ports being active with both pairs of ports during a succession of cycles equaling the number of valve ports.

23. In an internal combustion engine, a cylinder having two pairs of alternating inlet and exhaust ports lying in the same plane, and a sleeve valve rotatably mounted to operate within the cylinder and provided with a plurality of ports spaced at equal angular distances in the circumferential length of the valve and being greater in number than the totality of cylinder inlet ports, said cylinder and valve ports being relatively positioned and the valve movements timed to cause a valve port, in two succeeding cycles, to coact with each of said pairs of ports, and to be inactive with either of such pairs of ports during a third cycle, each of the valve ports being active with both pairs of ports during a succession of three cycles.

24. In an internal combustion engine a cylinder having a face to receive a manifold and provided with two pairs of alternating inlet and exhaust ports and with two pairs of inlet and exhaust passages each passage being independent of the others and each opening to the cylinder and to such face with each pair arranged side by side, and a rotatable internal valve member provided with valve ports lying in the plane of the cylinder ports and adapted to be simultaneously brought into registration with the intake or the exhaust ports as the valve member rotates.

25. In an internal combustion engine, a cylinder having a face to receive a manifold and having two pairs of alternating inlet and exhaust ports and with passages individual to and connecting the ports with said face, each pair of ports comprising an intake and an exhaust port, the passages of a pair of ports extending inward from said face side by side to provide a heat transmitting wall between such passages, and a rotatable valve sleeve operating within the cylinder and having ports positioned so that two of them coact simultaneously with said inlet or said exhaust ports of the cylinder as the sleeve rotates.

26. In an internal combustion engine, a pair of cylinders positioned to have a face to receive a manifold coöperative with both cylinders, each cylinder having two pairs of alternating inlet and exhaust ports, said cylinders also having passages connecting said ports with such manifold faces, said passages being relatively arranged to provide individual communication between a port and such face during activity of the port, and a rotatable sleeve valve for and operative within each cylinder, said valve having ports spaced to concurrently coact with both intake ports or both exhaust ports of a cylinder as the valve rotates.

27. In an internal combustion engine, a pair of cylinders positioned to have a face to receive a manifold coöperative with both cylinders, each cylinder having two pairs of alternating inlet and exhaust ports, said cylinders also having passages connecting said ports with such manifold faces, said passages being relatively arranged to provide individual communication between a port and such face during activity of the port, and a rotatable sleeve valve for and operative within each cylinder, said valve having ports spaced to concurrently coact with both intake ports or both exhaust ports of a cylinder as the valve rotates, the passages from a pair of ports of both cylinders having their face openings arranged side by side.

28. In an internal combustion engine, a pair of cylinders positioned to have a face to receive a manifold coöperative with both cylinders, each cylinder having two pairs of alternating inlet and exhaust ports, said cylinders also having passages connecting said ports with such manifold faces, said passages being relatively arranged to provide individual communication between a port and such face during activity of the port, and a rotatable sleeve valve for and operative within each cylinder, said valve having ports spaced to concurrently coact with both intake ports or both exhaust ports of a cylinder as the valve rotates, the passages from a pair of ports of both cylinders having their face openings arranged side by side with one port from each of such cylinder pairs having a passage in common.

29. In an internal combustion engine, a pair of cylinders positioned to have a face to receive a manifold coöperative with both cylinders, each cylinder having two pairs of alternating inlet and exhaust ports, said cylinders also having passages connecting said ports with such manifold faces, said passages being relatively arranged to provide individual communication between a port and such face during activity of the port, and a rotatable sleeve valve for and operative within each cylinder, said valve having ports spaced to concurrently coact with both intake ports or both exhaust ports of a cylinder as the valve rotates, said manifold having intake and exhaust formations to cooperate with the passage openings on said cylinder faces.

ERNEST R. OLSEN.